Figure 2:
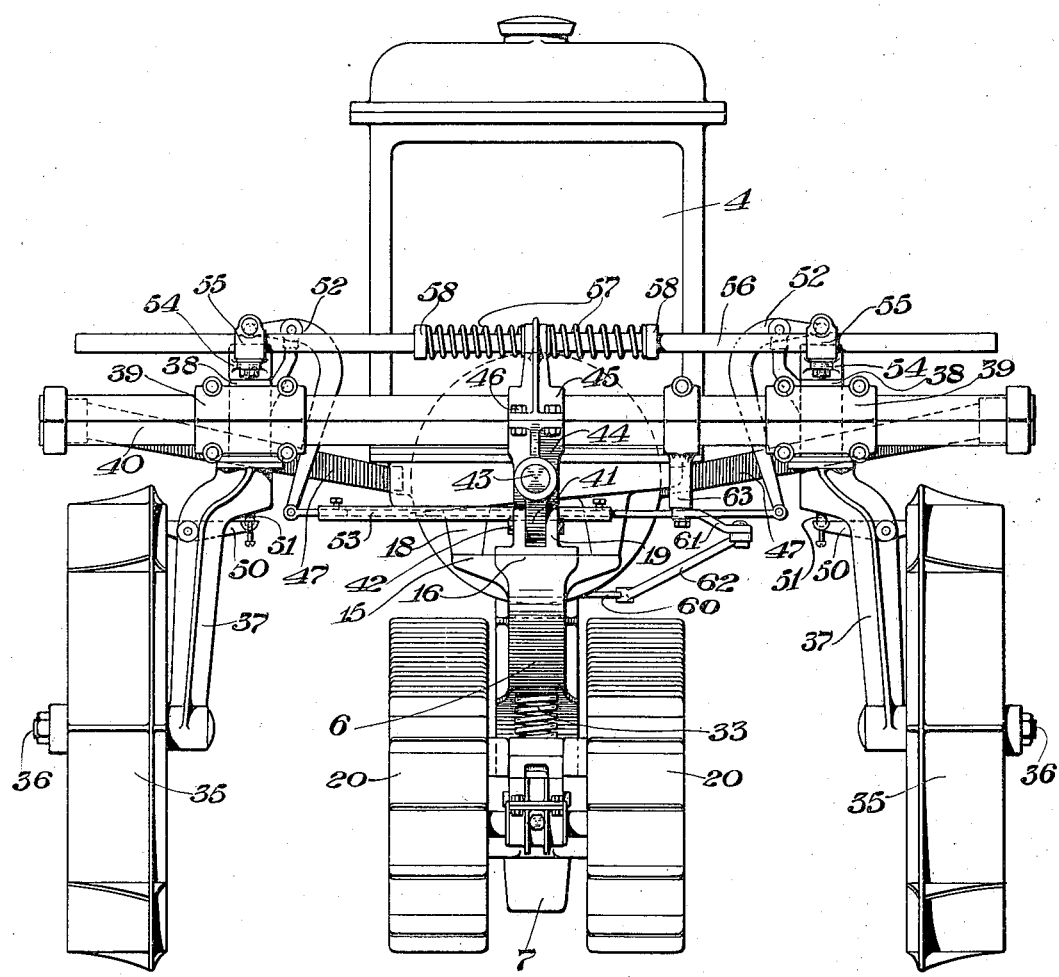

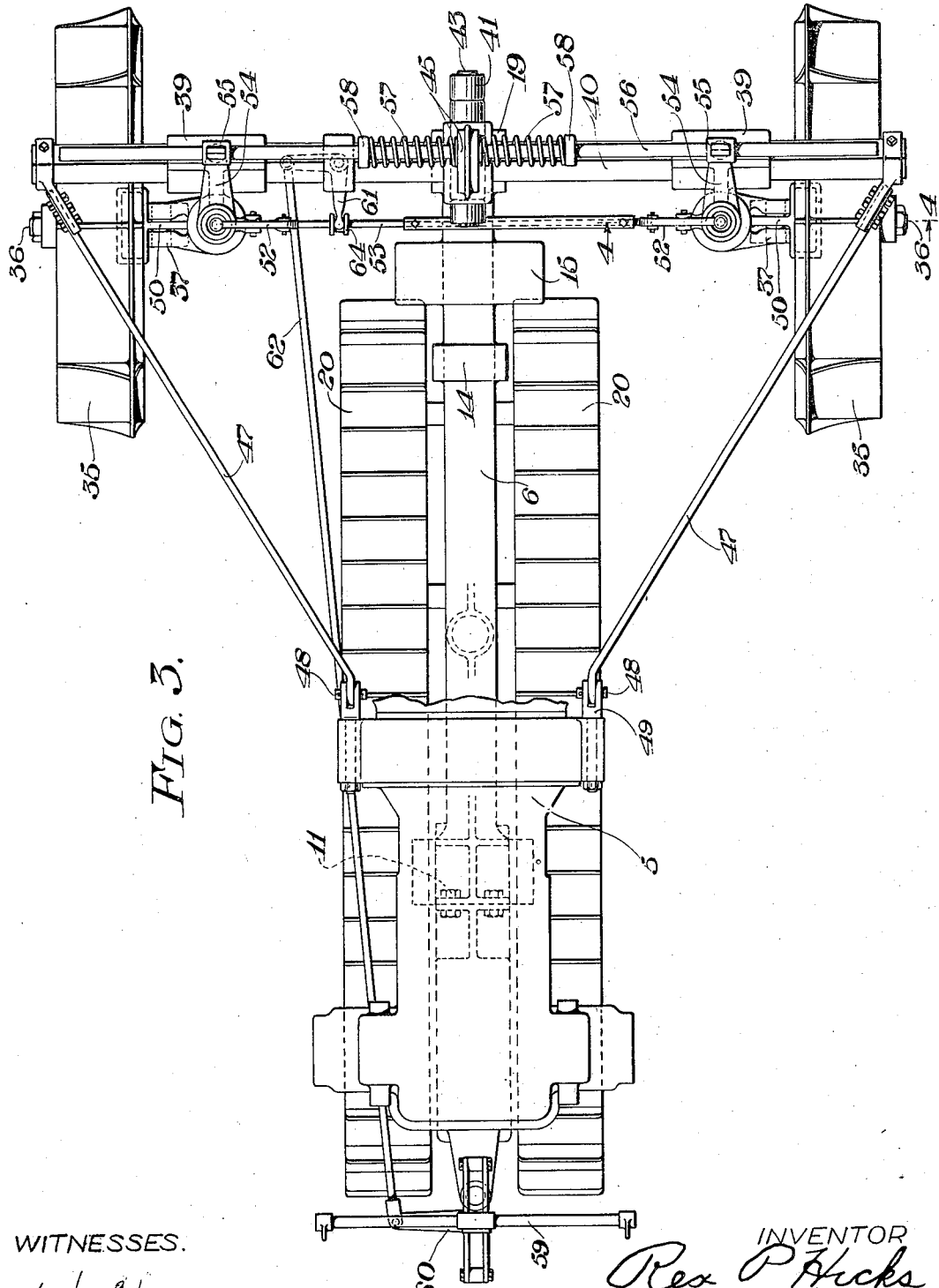

R. P. HICKS.
TRACTOR.
APPLICATION FILED MAY 12, 1919.

1,341,851.

Patented June 1, 1920.
3 SHEETS—SHEET 2.

WITNESSES.
H. D. Chase
C. L. Waal

INVENTOR.
Rex P. Hicks
By R. S. Caldwell
ATTORNEY.

R. P. HICKS.
TRACTOR.
APPLICATION FILED MAY 12, 1919.

1,341,851.

Patented June 1, 1920.
3 SHEETS—SHEET 1.

WITNESSES.
H. P. Chase
C. L. Waal

INVENTOR
Rex P. Hicks
By R. S. Caldwell
ATTORNEY

UNITED STATES PATENT OFFICE.

REX P. HICKS, OF MILWAUKEE, WISCONSIN, ASSIGNOR TO HICKS TRACTOR COMPANY, OF MILWAUKEE, WISCONSIN, A CORPORATION OF SOUTH DAKOTA.

TRACTOR.

1,341,851.

Specification of Letters Patent.

Patented June 1, 1920.

Application filed May 12, 1919. Serial No. 296,344.

*To all whom it may concern:*

Be it known that I, REX P. HICKS, a citizen of the United States, and resident of Milwaukee, in the county of Milwaukee and State of Wisconsin, have invented new and useful Improvements in Tractors, of which the following is a description, reference being had to the accompanying drawings, which are a part of this specification.

The invention relates to tractors and more particularly to the endless tread propelled type of tractor.

One of the objects of this invention is to provide a new and improved form of tractor frame.

Another object of the invention is to provide a new and improved construction for supporting the front portion of the frame.

A further object of the invention is to provide a new and improved construction for supporting the rear portion of the frame.

A further object of the invention is to provide a tractor for cultivating purposes wherein the propelling tread is relatively narrow so that it may run between rows of growing crops, with portions of the tractor straddling the rows and the front wheels of the tractor running between these rows and the next rows adjacent thereto.

A further object of the invention is to provide means for bracing the wheel supporting structure.

The invention further consists in the novel parts and combination of parts hereinafter described and more particularly set forth in the claims at the conclusion hereof.

Figure 4:
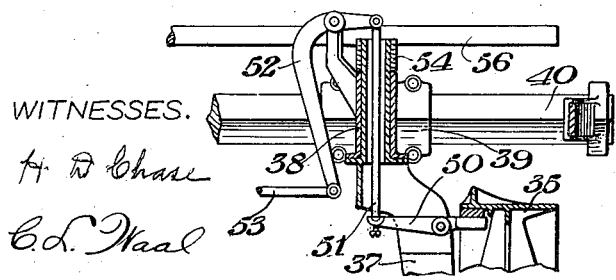
Figure 1:
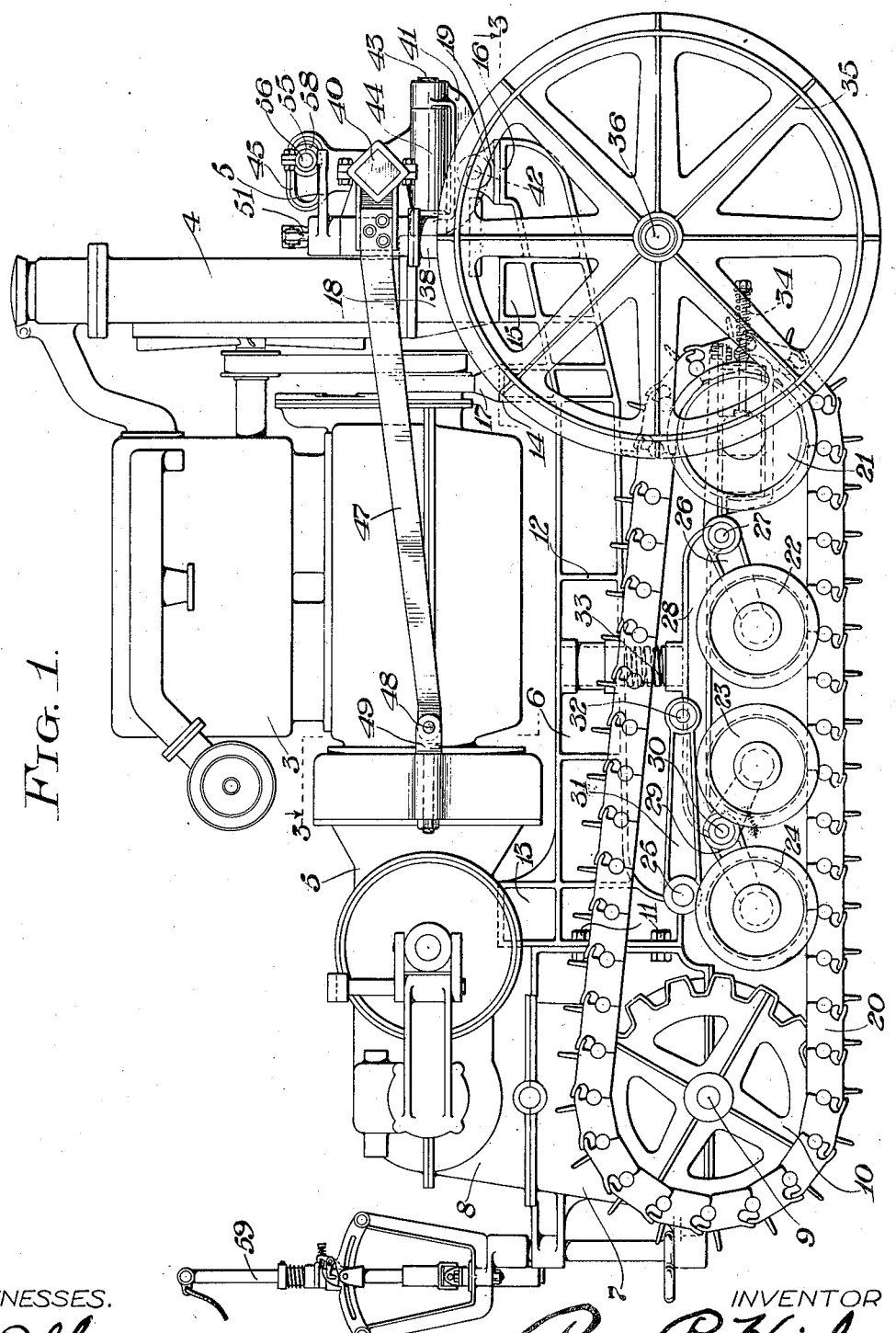

In the drawings:

Figure 1 is a side elevation view of the tractor embodying the invention; Fig. 2 is a front view thereof; Fig. 3 is a view taken on the line 3—3 of Fig. 3, parts being broken away; Fig. 4 is a section taken on the line 4—4 of Fig. 1.

The engine 3, cooling radiator 4, transmission mechanism 5, are mounted on a frame consisting of a beam 6 and a gear case 7. The gear case 7 is secured to the casing 8 of the transmission mechanism and power is transmitted from the engine through the transmission mechanism and gears in the case 7 to the rear axle drive shaft 9 carrying sprockets or drive wheels 10, as is more fully shown and described in my copending application, Serial No. 296,341, filed May 12, 1919, and which has resulted in Patent No. 1,324,592 dated Dec. 9, 1919. The front portion of the gear case 7 is secured to the rear end of the beam 6 by means of bolts 11. The beam 6 is in the form of a long narrow channel construction, reinforced by webs 12 and having upwardly projecting bearing pads or portions 13, 14, 15 and 16, which are machined off so as to have their top bearing surfaces in the same plane. A portion of the transmission case 8 rests upon the bearing portion 13, an engine shaft bearing 17 rests upon the bearing portion 14, and a radiator supporting member 18 rests upon the bearing portion 15, while a bracket 19 rests upon and is secured to the bearing portion 16.

The rear portion of the tractor is supported by an endless tread construction consisting of a pair of endless treads 20 running on the sprockets 10 and projecting forwardly therefrom to a position adjacent the front portion of the tractor and centrally thereof. The treads 20 are held in extended position, so that the lower run thereof bears upon the ground, by means of a truck construction, more fully shown and described in my application for tractor tread, Serial No. 296,343, filed May 12, 1919, and which will therefore be only briefly referred to here as consisting of rollers 21, 22, 23 and 24 for each tread, which are carried by a truck frame hingably connected to the rear portion of the beam 6 by a pivot member 25. This truck frame consists of a lever 26 pivotally connected intermediate its ends by a pin 27 to one end of a lever 28, a lever 29 pivotally connected intermediate its ends by a pin 30 to the other end of the lever 28, and a link 31 pivotally connected at one end by a pin 32 to an intermediate portion of the lever 28 and pivoted at its other end upon the pin 25, the lever 26 carrying the rollers 21 and 22 at the ends thereof and the lever 29 carrying rollers 23 and 24 at its ends, all of which is more fully shown and described in the aforementioned application. The truck construction is yieldingly maintained in engagement with the treads by means of a spring 33 interposed between the medial portion of the lever 28 and the beam 6. The front set of rolls 21 are slidably mounted in the forward end of the lever 26 and movable by a spring 34 to tension the tread, as more fully shown and described in the aforesaid tractor tread application.

The front portion of the tractor is supported by the front wheels 35 in the following manner: Each wheel is mounted on a stud axle 36 carried by forked axle supporting frame members 37 which have projecting tubular ends 38 journaled in couplings 39 adjustably secured upon a beam 40, disposed with one of its diagonals vertical. The adjustment of the brackets provides for spacing the wheels with respect to the tread so that the machine may run between crop rows of different widths. The beam 40 is secured to the frame and more particularly to the part 16 thereof by a double joint connection consisting of the bracket 19, a clevis 41 pivotally secured to the bracket 19 by a pin 42, running transversely of the machine, said clevis carrying a pivot member 43 running longitudinally of the machine and upon which a bracket 44 is pivotally mounted. The bracket 44 forms a part of a coupling, the other part being a bracket member 45, said parts 44 and 45 being clamped together and secured to the central portion of the beam 40 by means of bolts 46. Thus the beam 40 is carried by the frame and the wheels 35 are connected to the beam so that the forward portion of the structure is supported by the wheels. The mounting of the clevis 41 and the bracket 44 upon the pivot pin 43 permits tilting of the ends of the beam 40 when the wheels are traveling over uneven ground and one wheel is raised or depressed over that of the other, and the pivoting of the bracket 19 to the clevis 41 by the pin 42 permits a movement of the bracket 44 and consequently the beam 40 about the pin 42, which movement is resisted by struts 47 secured at their forward ends to the ends of the beam 40 and pivotally secured at their rear ends by pins 48 to forked head bolts 49 connected to a portion of the transmission casing 5, said struts being designed to relieve the beam 40 of stresses imparted to it from the wheels 35 meeting with obstructions, and also being designed to permit of the use of a pivoted connection between the beam 40 and the frame 6 of the tractor so as to relieve this connection of severe stresses, as a rigid connection between the beam 6 and the beam 40 would be subjected to dangerous stresses.

The steering of the vehicle is effected by braking either one of the front wheels, as more fully shown and described in my copending application, Serial No. 296,342, filed May 12, 1919, and portions of which are here shown but which will only briefly be referred to. The numerals 50 designate the brake levers carried by the forked frame members 37 and engaging the wheels and actuated by the rods 51 and levers 52 connected together by an adjustable connecting rod 53. The members 37 are connected together so that the turning of one operates to turn the other by means of crank arms 54 secured to the upper tubular ends 38 of the frame members 37 and pivotally connected to collars 55 adjustably clamped to a connecting rod 56. The wheels 35 are maintained in normal position, that is, parallel with the tractor tread, by springs 57 mounted on the rod 56 between collars 58 and the slotted upper end of the bracket 45, said rod 56 passing through said slotted end, said springs acting against the rod to hold the cranks 54 and frame members 37 in normal position. The operation of the brakes is effected by shifting the connecting rod 53 on the turning of the control member 59. The control member is operatively connected to a crank arm 60, as will more fully appear in my application on steering control mechanism filed May 12, 1919, Serial No. 296,345, and this crank is connected at its free end to a bell crank lever 61 by means of a connecting rod 62. The bell crank lever 61 is pivotally mounted on a bracket 63 secured to the beam 40. The bell crank 61 is connected to the connecting rod 53 by having one of its ends slidably and pivotally engaging in a collar 64 adjustably carried by said rod. With this construction the turning of the control member 59 will through the crank 60, rod 62 and lever 61, shift the rod 53 so as to cause actuation of either one of the brakes 50, as more fully described in the aforementioned application on steering mechanism.

The treads 20 are relatively narrow and are centrally disposed with respect to the machine so that they may run between rows of crops, and the wheels 35 carried on the end portions of the beam 40 may be so spaced from the tread as to run between these rows and the next adjoining rows, so that the tractor may be used for cultivating purposes.

From the foregoing description it will be noted that the frame is of simple construction and efficiently supported at its rear and front ends to carry the power plant of the machine.

It is to be understood that this invention is not limited to any specific form or arrangement of parts except in so far as said limitations are specified in the claims.

What I claim as new and desire to secure by Letters Patent is:

1. In a tractor, the combination, with a frame, of a pair of front wheels, wheel supports on which said front wheels are mounted, a beam to which said wheel supports are secured, a connection between said beam and the forward portion of the frame comprising a member pivotally connected to the forward portion of the frame with its pivot axis disposed transversely of the frame, and a pivotal connection between said member and said beam having a pivotal axis disposed longitudinally of the frame, and means secured to the beam and to a stationary part of the tractor for bracing said beam and its connection with the frame.

2. In a tractor, the combination, with a frame, of a clevis pivotally connected to the front portion of the frame, a bracket pivotally connected to said clevis at an angle to the clevis pivot, a beam secured to said bracket, bracing means connecting the end portions of the beam with a stationary part of the frame and permitting swinging movement of the ends of the beam, and wheels operatively connected with said beam.

3. In a tractor, the combination, with a frame, of a clevis pivotally connected to the front portion of the frame, a bracket pivotally connected to said clevis at an angle to the clevis pivot, a beam centrally secured to said bracket, struts connecting the ends of the beam with a stationary part of the frame and permitting swinging movement of the ends of the beam, wheel supports carried by the beam, and wheels mounted on said supports.

4. In a tractor, the combination, with the engine and transmission mechanism therefor, of a beam having upwardly projecting bearing portions upon which said engine and transmission are carried, a tread construction operatively connected to and supporting the rear portion of the beam, and wheels operatively connected to and supporting the front portion of the beam.

5. In a tractor, the combination, with the engine and transmission mechanism, of a lengthwise extending beam supporting said engine and transmission mechanism, a gear case connected to the rear end of the beam and carrying a drive shaft, sprockets mounted on the drive shaft, endless treads running on said sprockets at the sides of the beam and supporting the rear portion of the tractor, a truck construction for the tread pivotally connected to the rear portion of said beam, spring means interposed between said truck and beam, and wheels operatively connected to and supporting the front portion of said beam.

6. In a tractor, the combination, with the engine and transmission mechanism, of a lengthwise extending beam supporting said engine and transmission mechanism, a gear case connected to the rear end of the beam and carrying a drive shaft, a tread construction operatively connected to and supporting the rear portion of the beam and driven by said drive shaft, and wheels operatively connected to and supporting the front portion of the beam.

In testimony whereof, I affix my signature, in presence of two witnesses.

REX P. HICKS.

Witnesses:
R. S. CALDWELL,
H. D. CHASE.